United States Patent [19]

Cummings

[11] 3,993,707
[45] Nov. 23, 1976

[54] COMPOSITION FOR COATING WET SURFACES OR SURFACES IMMERSED IN WATER

[75] Inventor: Lowell O. Cummings, San Anselmo, Calif.

[73] Assignee: Pacific Vegetable Oil Corporation, San Francisco, Calif.

[22] Filed: Mar. 7, 1975

[21] Appl. No.: 556,385

Related U.S. Application Data

[60] Continuation-in-part of Ser. No. 408,453, Oct. 23, 1973, abandoned, which is a division of Ser. No. 196,778, Nov. 8, 1971, abandoned, which is a continuation-in-part of Ser. No. 157,638, June 28, 1971, abandoned.

[52] U.S. Cl. ............... 260/830 TW; 260/37 EP; 260/47 EP; 428/417; 428/418; 428/541
[51] Int. Cl.² ........................................ C08G 45/06
[58] Field of Search .......... 260/47 EN, 2 N, 18 EP, 260/830 TW

[56] References Cited
UNITED STATES PATENTS

| | | | |
|---|---|---|---|
| 2,723,241 | 11/1955 | De Groote et al. | 260/47 X |
| 2,880,194 | 3/1959 | Glaser | 260/47 |
| 3,160,518 | 12/1964 | Jorda | 260/47 |
| 3,639,344 | 2/1972 | Kinneman, Jr. et al. | 260/47 |
| 3,694,409 | 9/1972 | Miller et al. | 260/47 |

*Primary Examiner*—Theodore E. Pertilla
*Attorney, Agent, or Firm*—Owen, Wickersham & Erickson

[57] ABSTRACT

A system comprising an epoxy resin and a particular type of amine curing agent makes it possible to apply a coating to a wet or moist surface, even to a surface under water. These amine curing agents are substantially insoluble in water and are not water-sensitive. The amines which are used in this coating as a curing agent (in the form of a reaction product with a smaller amount of an epoxy resin to make an amine adduct) are of the formula:

(1)

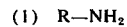

or (2)

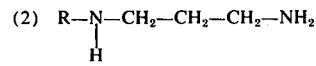

in which R is chosen from the group consisting of alkyl radicals having at least eight carbon atoms, and alkyl ether radicals of which one of the alkyl radicals has at least eight carbon atoms. The adduct of amine and epoxy resin is used as the curing agent for the main part of the epoxy resin.

11 Claims, No Drawings

COMPOSITION FOR COATING WET SURFACES OR SURFACES IMMERSED IN WATER

CROSS-REFERENCE TO RELATED APPLICATION

This application is a continuation-in-part of application Ser. No. 408,453, filed Oct. 23, 1973, now abandoned, which was a division of application Ser. No. 196,778, filed Nov. 8, 1971, now abandoned, which was a continuation-in-part of application Ser. No. 157,638, filed June 28, 1971, now abandoned.

BACKGROUND OF THE INVENTION

This invention relates to an improved coating composition which is capable of being applied on and adhering to a wet surface or object. The invention also relates to a method of preparing such a coating composition and to the resulting products. The coating comprises a two-part system of an epoxy resin and any of a special group of amine curing agents.

Two-part epoxy resin systems are well known as coatings for their outstanding adhesion to the substrates and for their toughness and chemical resistance. There are literally hundreds of such systems available which typically consist of part A, an epoxy resin, and part B, an amine-based compound. However, these prior-art systems are unable to obtain satisfactory results when coating a wet surface, for they do not adhere properly unless the surface is completely dry.

Robert M. Jorda described in U.S. Pat. No. 3,160,518 a process for applying a coating to surfaces immersed in water. In his process he used a coating comprising a polyepoxide and a considerable stoichiometric excess of a polyamine, the excess being at least 5 percent but more typically 50 percent. The excess was required because without it, the epoxy could not be completely cured and so could be washed away. It has now been determined that much, and in some cases even most, of the polyamine of Jorda dissolves in the water before it can react with the epoxy. How much will so dissolve depends on whether the water is agitated (e.g., if it is in a flowing stream or in the ocean near the surf), how soluble the particular amine is, the temperature of the water, the rapidity of the reaction between the amine and the epoxy and therefore how reactive the particular epoxy is, and so on. The finally reacted epoxy may be weakened or affected by retaining an excess of polyamine or may be weakened or affected by being deficient in polyamine, so that some of the epoxy resin is unreacted. The results are thus unpredictable, uncertain, unreliable. One can hardly know in advance all the affecting conditions well enough to be such that he will have exactly the right degree of excess of polyamines to achieve whatever results are optimum for the particular epoxy and particular polyamine. Thus, Jorda did not solve the problem completely, however much improvement he may have achieved over what had been done before. And the Jorda process always wastes material, by using more amine than what is really needed for the reaction.

Some epoxy-amine materials (including some of the Jorda materials) are, moreover, water-sensitive. Even when they have been fully reacted, when put in water or left in water, these materials may blister or change color, become opaque, tend to flake, or become soft.

SUMMARY OF THE INVENTION

I have now discovered superior coatings capable of application to wet surfaces and to application under water. My superior coatings do not require an excess of an amine, and they are reliable, giving predictable performances. The coating is applied as a liquid mixture of an epoxy resin with a curing agent, which is an epoxy-resin adduct of a certain class of amines, namely those in which the amine is of the following formula:

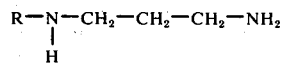

R denoting a radial chosen from the group consisting of alkyl radicals having at least eight carbon atoms, and alkyl ether radicals of which one of the alkyl radicals has at least eight carbon atoms. Both of these amines and their adducts are all substantially water-insoluble and are not significantly water-sensitive. Slight amounts may dissolve in water without significantly affecting the results but significant water solubility cannot be tolerated. The liquid mixture is an admixture in substantially stoichiometric amount of the epoxy resin in a liquid state and the epoxy-amine adduct in a liquid state, and such an admixture can be applied to moist or wet surfaces or to surfaces submerged under water. The fatty-amine adduct should contain at least fifteen percent by weight, based on total weight of the substance, of epoxy-resin component, and up to about 55 percent thereof. The adduct constituting the curing agent is, in other words, a condensation product of the above-defined amine and a small proportion of a polyepoxide having a plurality of vic-epoxy groups and containing only members of the group consisting of carbon, hydrogen, and oxygen and, in some but not all instances, chlorine. The amount of amine in the adduct is that required for complete reaction with all the epoxy resin, both that in the adduct and that serving as the main epoxy-resin component— in other words, the amount is substantially stoichiometric.

The mixture of epoxy-resin component and amine curing agent component is agitated for some minutes before applying the coating. There are advantages in using a mixture of a fatty amine and a smaller amount of an epoxy resin as the amine curing agent, for those adducts have less amine odor, less allergenic reactivity, and parts A and B are more readily mixed. In either event the amine or amine-epoxy adduct is preferably used in a substantially stoichiometric amount.

A wide variety of epoxy resins can be used. The condensation products of bisphenol-A and epichlorohydrin can be used, but also all the epoxy resins described in Jorda's patent can be used in the process of the invention. In general one can say that the polyepoxide should have more than one vic-epoxy group and should contain only members of the group consisting of carbon, hydrogen, oxygen and, in some but not all instances, chlorine.

Examples of the above-mentioned substantially water-insoluble amines are octyl amine, ethyl hexyl amine, dodecyl amine, N-oleyl 1,3 propane diamine, or tridecyl propyl ether propane diamine ($C_{13}H_{27}OC_3H_6NHC_3H_6NH_2$). The condensation product of a small proportion of a low-molecular-weight epoxy resin, as defined, and a large proportion of such a fatty amine or another of the given formula gives the amine curing agent of this invention.

The substantially freshly made mixture of the unreacted epoxy resin and fatty amine curing agent adduct may be applied to a damp or wet surface or in one embodiment to a surface immersed in water. The application can be done with a brush, a roller, or by spraying, even with a wet brush or a wet roller under water. After applying the mixture, the reaction between the epoxy resin and the amine curing agent takes place; the reaction occurs immediately, or substantially so, on the surface of the substance and then throughout the whole mixture, making a cured coating, which is bound directly to the substrate material.

All kinds of substrate material can be used, including iron, steel, other metals, wood, and masonry. The coating can be applied to wet or dry surfaces or in one method while the surfaces are immersed in water. It is not necessary to dry a wet floor before the floor is coated. After about four hours, the coating is hard, and after about 20 hours the film cannot be peeled off with a knife. Besides this, the floor is then water repellent and has a dry "feel" when rubbed with a finger, even when under water. The use of a glycol in part A or B is optional, but it appears that the system cures faster and has better brushing properties when a glycol, such as propylene glycol, is used, where the coating is a mixture of liquid resin and liquid amine.

It also appears that pigmented coatings apply and adhere better than clear coatings. When it is desired to use a pigmented coating, the pigment can be added either to part A or to part B, but, preferably, the pigment is added to part A, the epoxy-resin. For clear coatings, a mixture B is advantageously prepared by mixing a fatty amine in a large amount with a smaller amount of an epoxy resin and heating this mixture for about 1 hour to about 100° C., cooling it before using it as an amine curing agent in the two part system of the invention. The heating to 100° C. is not necessary, because the reaction will occur at room temperature and give some exothermic heat, but at a temperature of about 100° C. the reaction speed will be faster.

The same type of curing system can also be used to formulate a caulking compound which can be applied to damp or wet masonry and has a very good adhesion to wet concrete.

DETAILED DESCRIPTION

To contrast the invention with the prior art, examples are listed below in Table A, showing on the left conventional curing agents for epoxy resins, which, even if used in excess, nevertheless gave unsatisfactory results. On the right of Table A are listed some of the amine curing agents used in the process of the invention, which can be used in substantially stoichiometric amounts and with which improved results are obtainable.

TABLE A

| Conventional amine curing agents for epoxy resins | Substantially water insoluble amine curing agents for epoxy resins of this invention |
| --- | --- |
| Polyamides made from dimer acids and ethylene diamine or higher homologs of ethylene diamine are water-sensitive and are readily dispersed in water. | Condensation products of a low molecular weight epoxy resin and a larger portion of fatty diamines of the structure R—N—CH$_2$—CH$_2$—CH$_2$—NH$_2$. $\quad\mid$ $\quad$H |

TABLE A-continued

| Conventional amine curing agents for epoxy resins | Substantially water insoluble amine curing agents for epoxy resins of this invention |
| --- | --- |
| or A condensation product of, for example, diethylene triamine and a low-molecular-weight epoxy resin to yield an amine curing agent with excess amino groups, is water-sensitive and is readily dispersed in water. | |

The diamines, used in the method of the invention, have the unique property that they are able to coat damp or wet surfaces, apparently by displacing water from the surfaces. Yet water will not subsequently displace these amines from the surface, because these amines are water-insoluble or substantially so. What happens is not completely certain, but it is believed that the amine groups in these molecules are more polar than water and act to displace water on a molecular basis, after which the amine groups actually can adhere directly to the surface on which the coating is to be formed.

The basis of the invention is to use epoxy adducts of these fatty amines as epoxy curing agents. It is visualized that in this new system, there are unreacted fatty amine groups initially in the epoxy-resin-fatty amine mixture. By epoxy resin here is usually meant the condensation product of bisphenol-A and epichlorohydrin, but other epoxy resins can also be used.

The mixture of the unreacted epoxy resin and fatty amine curing agent may be applied to a damp or water-wet surface. This surface can, among others, be composed of steel, masonry, or wood. The fatty amines displace the water from the surface and adhere themselves to the surface. They remain on the surface because they, as well as the epoxy resins, are water-insoluble. Then the reaction between the epoxy resin and the previously unreacted fatty amine begins to take place, immediately on the surface of the substrate, and throughout the whole mixture, making a cured epoxy-amine coating which is bound directly to the substrate without an intervening water layer.

Another advantage of the epoxy system of this invention is that it can be formulated into a workable coating, without the use of organic thinners or solvents. The fatty amines are low-viscosity materials, and they comprise a fairly large portion of the entire epoxy-resin-amine mixture. Therefore, the mixture is low in viscosity and is easily applied as a coating. If desired, thinners or solvents can, of course, be used.

For best performance of the coating of this invention, the amine curing agent and the epoxy resin should be reacted in approximate stoichiometric quantities, that is, each amine hydrogen should react with one epoxy group. It is neither necessary nor advisable to use an excess of the amine, as Jorda indicated, although the invention can be worked in somewhat less ideal manner where either material is in excess, the material in excess just not reacting.

The epoxy-resin-fatty amine system can be used in several ways to obtain a coating. Examples of these applications are:

1. Iron, steel, other metals, wood, masonry and other materials with a cleaned surface can be coated with the non-aqueous admixture of liquid resin and liquid amine as above-described while these materials are submersed under water at all times. As in ordinary surface preparation for painting, it is preferred to clean the surface before application of the coating, as by brushing, sandblasting and the like, so that surface dust and oil are removed. In this way, ship bottoms, marine pilings, and other underwater structures can be coated. The coating, which also can contain pigments, can be brushed on or rolled on with a paint roller or applied in other manners to almost any clean underwater surface. The mixture has the general consistency of a paint and can be used as such. A container containing the non-aqueous epoxy-amine-mixed coating can be submersed under water, and a brush can be dipped in the can underwater, and the epoxy-amine coating can then be applied under water substantially as in applying it above water. The epoxy-amine coating preferentially adheres to the surface being coated, due to the stroking action of the brush. The coating is not displaced readily by any water movement and will subsequently and spontaneously cure underwater to a tough, adherent, corrosion-resistant film. The coating also performs excellently in sea water.

2. The same method can be followed to apply a coating to a partially submersed surface such as "splash zone" areas.

3. Damp, wet, or dry surfaces can be coated above water with the non-aqueous epoxy-resin-amine system. An important use of the epoxy-resin-amine system of the invention is for coating masonry or metal surfaces which are or tend to be damp or are even wet with water. It is well known that masonry surfaces are very hydrophilic; in fact, they always have a layer of water on them even though this layer of water may be only a few molecules thick. The same applies somewhat less to metals and wood. In conventional epoxy-amine coating systems, adhesion to damp surfaces is a problem. It is not a problem at all in the epoxy-fatty-amine system. An example of this use is coating damp concrete or brick floors, for concrete is almost always damp to some degree. In conventional preparation for applying an epoxy system the floor is cleaned very well with acids or detergents or both, and by scrubbing. Then the floor has to be dried carefully before the ordinary epoxy coating can be satisfactorily applied. This usually involves using a flame burner on the floor. Even this drying by flame only drives off the water for an inch or so below the surface, and the dampness in the lower concrete can re-penetrate the dried layer quickly by capillary action.

With the epoxy-fatty-amine system of this invention there is no need of drying the floor. In fact, small puddles of water that may remain on the floor after cleaning need not be removed, especially with the non-aqueous system. The pigmented or clear epoxy-fatty-amine is merely applied over all surfaces, water-wet or dry or damp. In a few minutes, the water "sweats out" through the coating and remains on top of the coating until it evaporates. The coating binds tenaciously to the substrate surface. It penetrates into microscopic cracks and crevices, displacing the water from them.

The following examples illustrate in greater detail the relative amounts in parts by weight of the components of compositions according to the invention and the use of these compositions.

EXAMPLE I

Preparation of the Coating Mixture

The following mixture, forming part A, is ground together on a paint mill:
100 parts iron oxide pigment
300 parts ground silica extender
700 parts epoxy resin
100 parts propylene glycol The epoxy resin is a low-molecular-weight liquid epoxy resin derived from bisphenol-A and epichlorohydrin. The equivalent weight per epoxy-unit is about 180. The viscosity is between 7,000 and 10,000 centipoise. This kind of epoxy resin is available under the trademark Araldite 6005 from CIBA-products Co. and under the trademark Epon 826, from Shell Chemical Co.

Part B is the reaction product of:
2 parts N-oleyl 1,3 propane diamine and
1 part of the above-mentioned epoxy resin.

The viscosity of part B is about 150 stokes, the Gardner color is 6, and it is a clear, transparent liquid.

The N-oleyl 1,3 propane diamine (also known as oleyl diamine) is of the formula

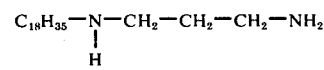

which has an amine number of about 320, an equivalent weight of about 175 as determined by the amine number, and an Iodine number of about 60. This amine is available as Duomeen O, from Armour Chemical Co. and as Adogen 572, from Ashland Chemical Co.

In part A the propylene glycol is optional. The system will function in all aspects very well without propylene glycol. However, it has been found that propylene glycol, or other glycols, gives the benefit of a faster cure, better leveling films, better gloss, and better brushing properties. It also increases the water resistance of the film. Because the glycols cannot be extracted out of the cured film with water, it is believed that the glycols actually react with the epoxy resin to form ethers and thus become part of the film.

Before applying a coating to a wet surface, 1200 parts of A are mixed with 470 parts of B. This mixture of A and B has a ratio by weight of the epoxy resin to the fatty amine of 1 to 1. After a thorough mixing for 3 to 4 minutes, the coating can be brushed on a wet porous ceramic building brick, with a wet brush, or on an underwater surface of steel, wood or other materials.

EXAMPLE II

Applying the Coating to a Damp or Wet Surface

A coating mixture, prepared as in Example I was applied by a wet brush to a porous, ceramic building brick, which had just previously been soaking in water. The coating applied was about 6 mils in thickness. In about three hours at room temperature the coating started to harden. After overnight curing at room temperature it was very tough, glossy, adherent film, that could be scratched with a knife only with difficulty. The film, however, exhibited some degree of flexibility and bounciness.

The coated brick was then examined by breaking it with a chisel. A microscopic examination of the cross section of the coating-brick interface revealed that the epoxy-fatty-amine coating had indeed penetrated all the cracks and holes of the water-saturated brick completely, even small cracks ¼ inch deep. There were no uncoated surfaces.

EXAMPLE III

Coating Steel Underwater

The coating mixture of Example I was applied to a 4 inches by 12 inches 20-gauge steel test panel. Before being coated, the panel was submersed in a container 1 inch deep under water. The coating was applied easily with a brush by submersing the paint-filled brush under water and onto the panel. Brushing was smooth and easy, and a film of about 3 to 5 mils was applied quickly. It was rather smooth but did not exhibit as much leveling as observed when it was applied above water. The film on steel cured very well under water (55° to 60° F. during the cure time). It started to harden in about four hours and was a hard, cured, adherent film after 15 hours. The film could not be peeled off the steel in attempts to delaminate it with a knife. The film was water-repellent and had a dry feel when rubbed with the finger underwater.

A similar test in sea water at 55° F. gave the same results.

It was noted that the steel panel did not rust even on uncoated areas near the edge of the coating. Evidently the fatty amine had formed a thin film on the steel near the edge of the film.

EXAMPLE IV

This is a comparison example in which an epoxy resin-amine system has been prepared from conventional components. To illustrate the differences between the method of the invention and the results obtained by it and the method and results of a conventional coating system, the following amine curing systems were mixed with 1200 parts A described in Example I, comprising 700 parts epoxy resin:

a. 84 parts diethylene triamine (12 parts per hundred parts of epoxy resin in A).

b. 230 parts Versamid 125 (33 parts per hundred parts of epoxy resin in A). This is a polyamid curing agent produced by General Mills of which product the amine number is 270. This curing agent is believed to be a condensation product of dimer acids and diethylene triamine.

c. 230 parts Versamid 140. The same product as shown under (b) but with an amine number of 320.

In all three cases, the coating could not be applied under water. The coating would not adhere to the steel but would tend to slip over the steel when attempting to brush it under water. All of these coatings tended to emulsify in the water, while attempts were made to adhere it to the panel by vigorous brushing.

EXAMPLES V–X

In Table B below, amine curing agents of the general formula

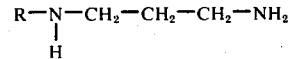

are shown, which can successfully be used in the system of the invention when the preparation of the coating mixture has been done as disclosed in Example I.

TABLE B

| Example | Amine Curing Agent | R in General Formula |
|---|---|---|
| V | Cocodiamine* (Duomeen C, Armour) | $C_{14}H_{29}-$ |
| VI | Tallow diamine (Duomeen T, Armour) | $C_{18}H_{35}-$ <br> $C_{18}H_{37}-$ |
| VII | Oleyl diamine (Adogen 572, Ashland)** | $C_{18}H_{35}-$ |
| VIII | Soy diamine | $C_{18}H_{35}-$ <br> $C_{18}H_{33}-$ |
| IX | Tall oil fatty acid derived diamine (Adogen 551, Ashland) | $C_{18}H_{35}-$ <br> $C_{18}H_{33}-$ |
| X | Tridecyl propyl ether propane diamine (Adogen 583, Ashland) | $C_{13}H_{27}-O-C_3H_6-$ |

*cocodiamine is derived from the fatty acids in coconut oil (Armour Chemical Co., Chicago)
**Ashland Chemicals, Columbus, Ohio.

The epoxy-resin-amine system with the adducted amine curing agents of Table B were tested to evaluate their effectiveness in an underwater clear coating. Clear coatings were used here as a severe test for underwater application and adhesion. Pigmented coatings appear to apply and adhere better than clear coatings. It is realized that the amine-epoxy ratio was not precisely stoichiometric in every case, but the ratio is fairly close to stoichiometric. Besides this, it appears that masonry surfaces are generally easier to coat underwater than steel surfaces.

To test the systems in which the amine curing agents of Examples V–X were used, a clear coating was prepared consisting of:

3 parts by weight amine from each of Examples V–X and 1 part epoxy resin with an equivalent weight per epoxy-unit of 180 and a viscosity between 7,000 and 10,000 centipoise.

These components were mixed in a glass flask, heated to about 100° C. for one hour and cooled overnight. Then this liquid or semi-crystalline reaction product was mixed with a liquid epoxy resin in a ratio of 1.5 parts of liquid epoxy resin to 1.0 parts of the reaction product between the abovementioned amine-epoxy-resin mixture. The obtained coating system was brushed under water on steel to obtain a coating thickness of 2–5 mils. The results are summarized in Table C.

TABLE C

| Used Amine Curing Agent of Example | Amine | Appearance of the Coating |
|---|---|---|
| V | Cocodiamine | Semi-crystalline, thick, fairly good cure |
| VI | Tallow diamine | Hazy, fairly good cure |
| VII | Oleyl diamine | Clear smooth film, very good cure |
| VIII | Soy diamine | Hazy film, very good cure |
| IX | Tall oil fatty | Clear film, very good cure |

TABLE C-continued

| Used Amine Curing Agent of Example | Amine | Appearance of the Coating |
|---|---|---|
| X | acid<br>Tridecyl propyl ether propane diamine<br>($C_{13}H_{27}$-O-$C_3H_6$NH$C_3H_6$NH$_2$) | Very clear, light colored film, very, very good cure |

Oleyl diamine, tall oil fatty acid diamine, and tridecyl propyl ether diamine appear to be very good amines here. Others were not as good, but did perform.

In Table D, the results are shown of tests comparable to those given in Table C, but in these tests conventional amine curing agents have been used. The coating did not give the desired results, because the composition emulsified.

TABLE D

| Example | Amine Curing Agent used in the Clear Coating Test | Results |
|---|---|---|
| XI | Diethylene triamine (12 parts per hundred) | Would not coat steel but only emulsified in water |
| XII | Versamid 125 (33 parts per hundred) | Would not coat steel but only emulsified in water |
| XIII | Versamid 140 | Would not coat steel but only emulsified in water |

It has been found that small amounts of water-sensitive amine curing agents and accelerators can be added to the fatty-amine-epoxy adducts without degrading the film forming underwater or on wet surfaces. This appears from Example XIV.

EXAMPLE XIV 2 parts liquid epoxy resin as in the preceeding example were thoroughly mixed with 1 part of a mixture comprising:
70 parts tall oil fatty acid derived diamine
14 parts epoxy resin (as used in Example I)
10 parts diethylene triamine
6 parts DMP 30; 2, 4, 6-tri(dimethylaminomethyl-phenol).

The preparation of the coating was the same as for Example I and the applying of the coating to steel underwater was the same as in Example III. The obtained coated steel had the desired properties of a high strength coating with good results under water.

EXAMPLE XV

In this example a higher molecular weight epoxy resin was used t make an amine curing agent.
Therefore, a mixture was prepared of
70 parts oleyl diamine and
30 parts Araldite 7071 (CIBA) which is a semi-solid resin, and the equivalent weight per epoxy unit is 575.

This mixture was heated for two hours at 100° C., and then used as an epoxy curing agent as indicated in Examples V–X. It appeared to perform even better than the same type of curing agent made with lower molecular weight epoxy resin.

EXAMPLE XVI

The same type of curing system as described in Example I–III, V–X and XIV can be used to formulate a caulking compound. It turns out that the diamine-epoxy adducts can be formulated with certain low viscosity epoxy resins to give very tough, adherent, rather flexible solid resins which when pigmented, make a very satisfactory caulk for using on damp or wet masonry.

For such a caulking mixture the following formulation can be used:

Part A consisting of Araldite 506, low molecular weight epoxy resin containing 11 percent butyl glycidyl ether, Part B: 500 parts of a reaction product between 70 percent oleyl diamine and 30 percent Araldite 6005, higher molecular weight epoxy-resin,
500 parts calcium carbonate extender pigment
90 parts asbestos fiber,
90 parts titanium dioxide pigment.

Part B was blended together in a mixer until smooth, after which 80 parts A were mixed with 180 parts B. This was a thick white liquid which was easy to pump from a caulking gun, but when put in place in a crack, it did not sag. It started to harden in about 5 hours, and was a rubbery white solid overnight. It had a very good adhesion to wet concrete.

EXAMPLE XVII

A mixture forming part A is ground on a paint mill, and this mixture consists of:
250 parts rutile titanium dioxide
300 parts ground silica extender
680 parts epoxy resin, as used in Example I.

The reaction product of:
2 parts tall oil fatty acid derived diamine as used in Example IX
1 part epoxy resin, as used in Example I has a viscosity of about 180 stokes, a Gardner color of 5 to 6 and is a clear transparent liquid.

85 parts of this reaction product are blended with 15 parts of propylene glycol, and this mixture is the adduct, part B. Instead of propylene glycol another glycol can also be used such as ethylene, butylene or hexylene glycol.

The above components are mixed in a ratio of 1.5 parts A and 1 part B.

This made an especially good underwater coating for rolling with an ordinary paint roller or brushing if desired.

A coating composition can be made according to the invention containing (A) an epoxy resin free of water and of unreactive solvents for said resin consisting of a polyepoxide having a plurality of vic-epoxy groups and containing only members of the group consisting of carbon, hydrogen, and oxygen and, in some cases, chlorine, and as an amine curing agent, (B) a mixture of 2–6 parts by weight of an amine of the formula specified above and of one part by weight of a polyepoxide having an equivalent weight per epoxy-unit of about 180, and where the (B) mixture is heated for about 1 hour at a temperature below 125° C. and cooled before being mixed with part (A).

As the above examples indicate, the epoxy resin may be any polyepoxide having more than one vic-epoxy group and containing no atoms except carbon, hydrogen, oxygen and, in some cases, chlorine. Wide variety in physical properties is feasible.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A coating composition capable of being applied on and adhering to a wet surface or object, consisting essentially of an intimate mixture of:
   A. an epoxy resin free of water and of unreactive solvents for said resin consisting of a polyepoxide having a plurality of vic-epoxy groups and containing only members of the group consisting of carbon, hydrogen, oxygen and, chlorine, and
   B. a substantially stoichiometric amount of an amine curing agent which is substantially insoluble in water and not water-sensitive and is a condensation product of a small proportion of a polyepoxide having a plurality of vic-epoxy groups and containing only members of the group consisting of C, H, O, and Cl, and a large proportion of a fatty amine of the formula:

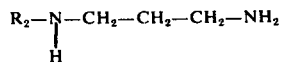

where $R_2$ is chosen from the group consisting of alkyl-radicals having at least eight carbon atoms and alkyl ether radicals of which one of the alkyl radicals has at least eight carbon atoms.

2. A coating composition of claim 1 in which the amine curing agent (B) is a mixture of two to six parts by weight of an amine of the specified formula and of one part by weight of the polyepoxide, the polyepoxide having an equivalent weight per epoxy-unit of about 180.

3. The coating composition of claim 2 wherein the mixture making up the condensation product constituting the curing agent (B) is heated for about one hour at a temperature below 125° C. and cooled before being mixed with part (A).

4. A coating composition of claim 1 in which the amine curing agent (B) is a mixture of 70 parts by weight of oleyl diamine and 30 parts by weight of an epoxy resin with an average molecular weight per epoxy unit of about 575, which mixture is heated for 2 hours at 100° C. and then cooled, before being mixed with part (A).

5. A coating composition of claim 1 in which the amine curing agent (B) comprises:
   53 parts octyl amine,
   30 parts said polyepoxide,
   10 parts diethylene triamine, and
   7 parts 2,4,6-tri(dimethylaminomethylphenol).

6. A coating composition of claim 1 in which the amine curing agent (B) comprises:
   2 parts tall oil fatty acid derived diamine wherein R is a mixture of $C_{18}H_{35}$ and $C_{18}H_{33}$, and
   1 part of said polyepoxide.

7. A coating composition of claim 1 in which the polyepoxide (A) is mixed with a glycol, before adding the amine curing agent.

8. A coating composition of claim 1, in which the amine curing agent (B) is mixed with a glycol.

9. A coating composition of claim 1, in which the polyepoxide (A) is mixed with propylene glycol, before adding the amine curing agent (B).

10. A coating composition of claim 1 in which the amine curing agent (B) is a mixture of two to six parts by weight of an amine of the specified formula and of one part by weight of the polyepoxide, the polyepoxide having an equivalent weight per epoxy unit of about 575.

11. A coating composition of claim 1 in which the polyepoxide constitutes between 15 and 55 percent of said condensation product (B).

* * * * *